(12) United States Patent
Lee et al.

(10) Patent No.: US 6,314,186 B1
(45) Date of Patent: Nov. 6, 2001

(54) BLOCK CIPHER ALGORITHM HAVING A ROBUST SECURITY AGAINST DIFFERENTIAL CRYPTANALYSIS, LINEAR CRYPTANALYSIS AND HIGHER-ORDER DIFFERENTIAL CRYPTANALYSIS

(75) Inventors: Chang-hyi Lee, Guachun; Young-tae Cha, Sungnam, both of (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/095,845

(22) Filed: Jun. 11, 1998

(30) Foreign Application Priority Data

Jun. 23, 1997 (KR) .................................. 97-026558

(51) Int. Cl.⁷ ...................................... H04L 9/28
(52) U.S. Cl. ................................................ 380/28
(58) Field of Search .................................. 380/28

(56) References Cited

U.S. PATENT DOCUMENTS 5,003,597 * 3/1991 Merkle ................................... 380/37
5,623,548 * 4/1997 Akiyama et al. ....................... 380/28
5,838,794 11/1998 Mittenthal .............................. 380/28

FOREIGN PATENT DOCUMENTS

WO 98/00949  1/1998  (WO) .

OTHER PUBLICATIONS

Schneier, Applied Cryptography, pp. 272, 320–323, 1996.*
Mittenthal, Statistical Efficient Inter–Round Mixing in Block Substitution Devices, Teledyne, 1996.*
Lee, et al., "The Block Cipher: Snake with Provable Resistance Against DC and LC Attacks," *Proc. of JW–ISC*, 1997, Session 1, pp. 3–17.
Knudsen, "Truncated and Higher Order Differentials," *Advances in Cryptology, Fast Software Encryption*, 1995.
Matsui, "Linear Cryptanalysis Method for DES Cipher," *Advances In Cryptology, Endocrypt*, 1993, pp. 391–397.
Nyberg, "S–Boxes and Round Functions with Controllable Linearity and Differential Uniformity," *Advances In Cryptology, Fast Software Encryption*, 1994, pp. 111–129.
Internet thread concerning Teledyne, cypherpunks@toad.com, Jul. 1996.*

* cited by examiner

*Primary Examiner*—Gail Hayes
*Assistant Examiner*—James Seal
(74) *Attorney, Agent, or Firm*—Burns, Doane, Swecker & Mathis, L.L.P.

(57) ABSTRACT

The present invention relates to the block cipher algorithm based on the prior Feistel type block cipher algorithm (or similar to DES algorithm). Usually the security of Feistel type block cipher algorithm depends on the structure of its round function. More specifically, the present invention relates to the round function structure of the Feistel type block cipher algorithm, in the instance that the round input data block is divided into 8-bit blocks and the divided sub-blocks are fed, with the combined output data of the previous S-box, into 256×8 S-box, except for the first input sub-data block. The first sub-data block one is directly fed into the first S-box. The total output data block, after these steps, is rotated by 8-bits and this rotated result is the output of the current round function.

26 Claims, 4 Drawing Sheets

ROUND KEY GENERATION

*FIG. 3*

BLOCK CIPHER ALGORITHM HAVING A ROBUST SECURITY AGAINST DIFFERENTIAL CRYPTANALYSIS, LINEAR CRYPTANALYSIS AND HIGHER-ORDER DIFFERENTIAL CRYPTANALYSIS

Korean Application 1997-26558, filed Jun. 23, 1997 upon which a claim for priority is based, is herein incorporated by reference.

FIELD OF THE INVENTION

The invention relates to a data encryption method, and to the fast block cipher algorithm that is secure against differential cryptanalysis, linear cryptanalysis, and higher-order differential cryptanalysis. More specifically, it can be embodied easily and executed rapidly in comparison with the conventional block cipher algorithms.

DESCRIPTION OF THE RELATED ART

Conventional cipher algorithms are designed intuitively or through the practical experience of a designer. Therefore, many on-going field-tests may be needed to ensure the security of the cipher algorithm.

A common block cipher algorithm is based on DES, which is adopted as the United States Data Processing Standard 46 (FIPS PUB46) by the United States Standardization Office. DES is a block cipher algorithm which encrypts data in 64-bit blocks.

A 64-bit block of plain text serves as an input to one end of the algorithm and a 64-bit block of cipher text is output from the other end. DES is, therefore, a symmetric algorithm.

The same algorithm and key are used for both encryption and decryption, except for minor differences in the key schedule. The key length is 56-bits. However, the key is usually expressed as a 64-bit number, where 8-bits are used for parity checking and are therefore, ignored during encryption/decryption. Also the parity bits are the least significant bits of the key bytes. The key can be any 56-bit number and can be changed at any time. Several numbers are considered weak keys, but these weak keys are easily avoided, since all security rests within the key.

At its simplest level, an algorithm is nothing more than a combination of the two basic techniques of encryption, that is, confusion and diffusion. The fundamental building block of DES is a single combination of these techniques, i.e., a substitution followed by a permutation in the text, based on the key, commonly referred to as a round.

DES has 16 rounds. It applies the same combination of techniques on plain text block 16 times. The DES algorithm uses only standard arithmetic and logical operations on a maximum of 64-bits, thus it was easily implemented in late 1970s hardware technology. The repetitive nature of the algorithm made it ideal for use on a special purpose chip. Initial software implementations were clumsy; however, current implementations have improved.

DES operates on a 64-bit block of plain text. After an initial permutation, the block is broken into a right half and a left half, each 32-bits long. Then, there are 16 rounds of identical operations, called function F, in which the data is combined with the key. After the sixteenth round, the right and left halves are joined, and a final permutation, the inverse of the initial permutation, completes the algorithm.

In each round, the key bits are shifted, and then 48-bits are selected from the 56-bits of the key. The right half of the data is expanded to 48-bits via an expansion permutation, combined with 48-bits of a shifted and permuted key via an XOR, sent through 8 S-boxes producing new 32-bits, and permuted again. These four operations make up the round function F. The output of function F is then combined with the left half via another XOR. The results of these operations become the new right half; and the old right half becomes the new left half. The operations are repeated 16 times, thereby making 16 rounds of DES.

Based on differential cryptanalysis, linear cryptanalysis and higher-order differential cryptanalysis, DES is attackable by using $2^{47}$ chosen cipher texts via differential cryptanalysis and by using $2^{43}$ known cipher texts via linear cryptanalysis.

Many cipher algorithms have been proposed for handling the above cryptanalysis, and one comes to think that the encryption algorithm that is resistant against the above attacks (differential and linear) will be a secure one. For additional security, a method has been developed to construct an encryption algorithm by the theoretical and logical proofs of the algorithm's resistance against differential and linear cryptanalysis. However such an approach is very difficult.

The first attempt to solve these problems was the MISTY algorithm of Japan. In the MISTY algorithm, S-boxes consisting of 7-bits or 9-bits have simple algebraic form. A disadvantage of the MISTY algorithm is that an implementation of it requires a complicated recursive structure.

SUMMARY OF THE INVENTION

It is an object of the present invention to provide a rapid block cipher algorithm to address the problem which ensures its security against the differential cryptanalysis and linear cryptanalysis attacks, and moreover against the higher-order differential cryptanalysis.

The present invention, herein referred to as SNAKE, has a round function differing from the conventional block cipher algorithms. The round function of SNAKE has a very simple structure which has a basic logical operation (exclusive OR-operator), and an 8-bit rotating operation (except for the S-boxes which are required to have high non-linearity for their security), in order to simplify the embodiment. SNAKE, however, does not have the same recursive structure as the MISTY algorithm, but is instead structured for the output data block of one S-box to be fed back to the left next S-box, and it is shifted in the left by 8-bits. This structure brings strict avalanche diffusion to the flowing data, so as to make the round function's linearity and differential uniformity low. In the verification of its resistance against differential and linear cryptanalysis, the inventors' concept of 'Difference string' and 'Fundamental Differential Matrix' has been developed wherefrom theoretical inducement has been established.

Figure 2A:
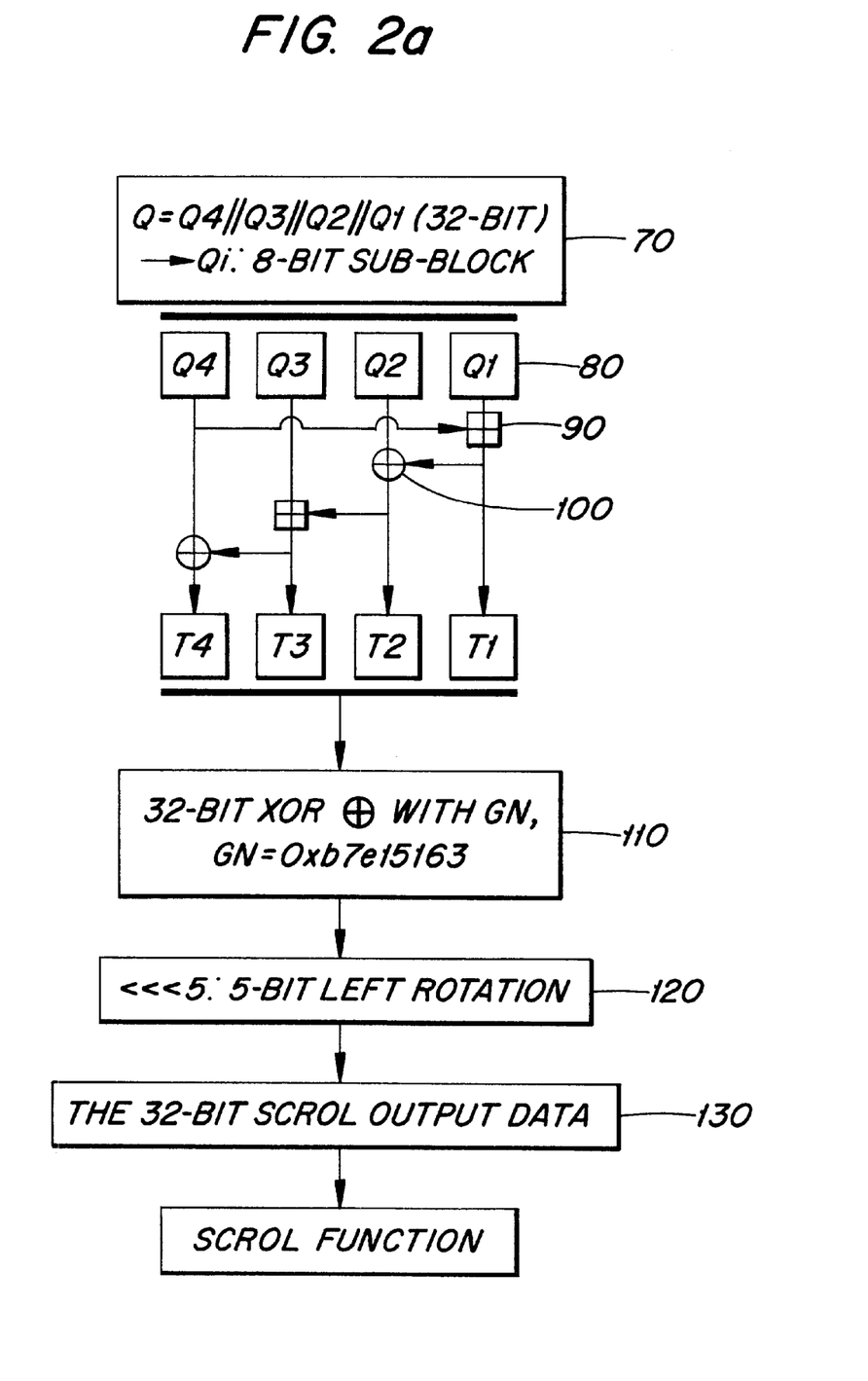
FIG. 2A illustrates the SCROL function to be directly used for the practical round key generation in FIG. 2B.
Figure 2B:
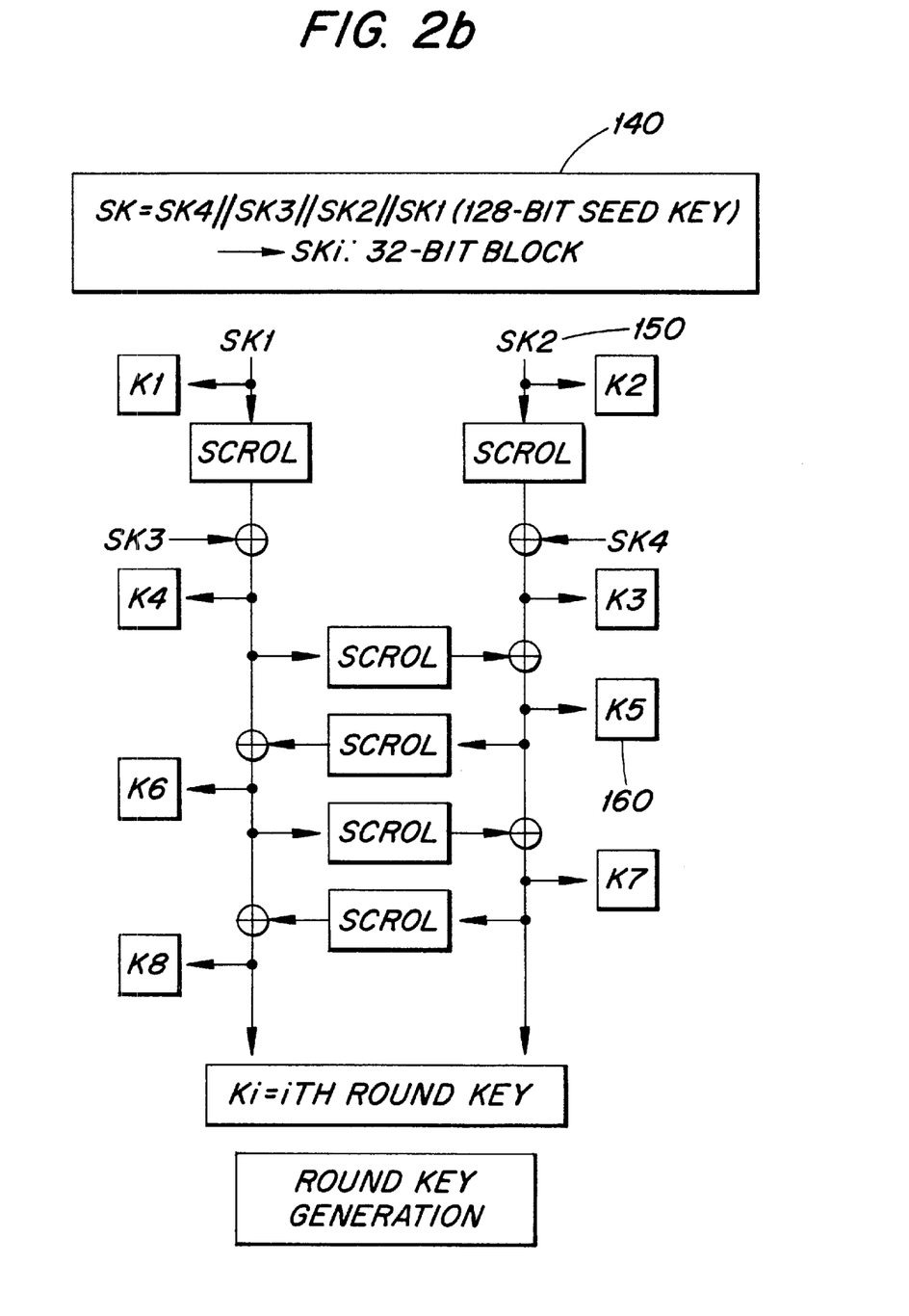

The key scheduling process of SNAKE will now be described. Initially, the process is fed a random 128-bit seed key and the seed key is broken into four 32-bit sub-blocks. The sub-blocks go through the process illustrated in FIG. 2 with a 32-bit constant irrational number GN having a characteristic sequence of random bits via the three operations: exclusive-OR operation; 256-modulus addition; and 5-bit left rotation. This processes prevents the recovery of the previous round's key, even if the next round's keys are found.

BRIEF DESCRIPTION OF THE DRAWINGS

Other objects and advantages of the present invention will become apparent upon reading the following detailed descriptions and upon reference to the following.

FIGS. 2A–2B illustrate the present inventions's key scheduling process from the 128 seed key bits for the generation of round keys.

While the invention is susceptible to various modifications and alternative forms, specific embodiments thereof have been shown by way of example in the drawings, and will be herein described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENTS

There is provided a rapid block cipher algorithm that is resistant against differential cryptanalysis, linear cryptanalysis, and higher-order differential cryptanalysis.

An embodiment of the algorithm of the present invention is called SNAKE which encrypts data in 64-bit blocks. A 64-bit block of plain text is input in one end of the algorithm and a 64-bit block of cipher text is output out the other end. SNAKE is a symmetric algorithm, i.e., the same algorithm and key are used for both encryption and decryption, except for minor differences in key scheduling. The seed key length is 128-bits. Before the data-encryption and data-decryption, the sixteen round keys to be used in each round are settled by a key scheduling process from the seed key as will be described below.

(1) Key Scheduling

The 128-bit seed key Sk is broken into four 32-bit blocks, e.g.,

Sk=Sk4∥S3∥S2∥S1, where, from the right, the least significant part of the 128-bit integer is arranged and concatenated. Then, Sk1 and Sk2 are the first and second round key respectively.

For the generation of the remaining rounds' keys, a function 'SCROL' is introduced which receives 32-bit data and outputs the same length of data. With reference to FIG. 2A, block 70 illustrates a 32-bit input data block to the function, named SCROL, for the round key generation. Block 80 illustrates subdivided 8-bit data blocks from the 32-bit input data block to the SCROL function. Block 90 illustrates an 8-bit modular addition (mod.256) operator. Block 100 illustrates a logical exclusive-OR operator. Block 110 illustrates the combining process (via an exclusive-OR operator) with the 32-bit constant number GN which has the characteristics as in a sequence of random bits. Block 120 illustrates 5-bit left rotation of the 32-bit data resulted from the previous step. Block 130 illustrates the final 32-bit output data from the SCROL function.

With respect to FIG. 2B, block 140 illustrates the 128-bit seed key Sk which is to be broken into 32-bit sub-blocks, Sk1, Sk2, Sk3, and Sk4, for the round key generation process. Block 150 illustrates the 32-bit subdivided seed key blocks from the 128-bit seed keys. Block 160 illustrates the generated round keys by the key generation process, wherein Ki denotes the 32-bit i-th round key.

If 32-bit data, Q=Q4∥Q3∥Q2∥Q1, (Xi:8-bits) are input to SCROL, then its output, e.g., R, can be represented by the following:

T1=X1+X4; (8-bits)

T2=X2⊕T1; (8-bits)

T3=X3+T2; (8-bits)

T4=X4⊕T3; (8-bits)

T=T4∥T3∥T2∥T1; (32-bits)

R=(T⊕0xb7e11563)<<<5;

where the notation, '∥', denotes concatenation, '⊕' means the exclusive-OR operator, '+' means the 256-modular addition, and '(*)<<<5' denotes the left rotation of * by 5 bits.

Finally, using this SCROL function, the remained rounds' keys Ki, i=3, 4, . . . , 16 are generated, e.g.:

K3=SCROL(Sk2)⊕Sk4;

K4=SCROL(Sk1)⊕Sk3;

K(i+1)=SCROL(Ki)⊕K(i-I); i=4,5, . . . , 15.

(2) S-boxes, Round Function

The S-boxes are used in round function F.

There are four S-boxes in our exemplary embodiment, SNAKE, and the Sboxes, S1, S2, S3, S4 are recommended to have the following two types:

TYPE1: S1=S2=S3=S4=f(x);

TYPE2: S1=S3=f(x), S2=S4=g(x);

where $f(x)=x^{-1}$, the algebraic inversion of the Galois Field GF(256), and g(x)=h(h(x)): the self-composition of the modular exponent function based 45, i.e. $h(x)=45^x \mod 257$.

Furthermore, in an exemplary embodiment, TYPE1 is used for the hardware and software implementation, and TYPE2 is used for the software implementation. TYPE1 can be embodied in a circuit design for a chip at a gate level, instead of using the ROM tables.

Figure 1:
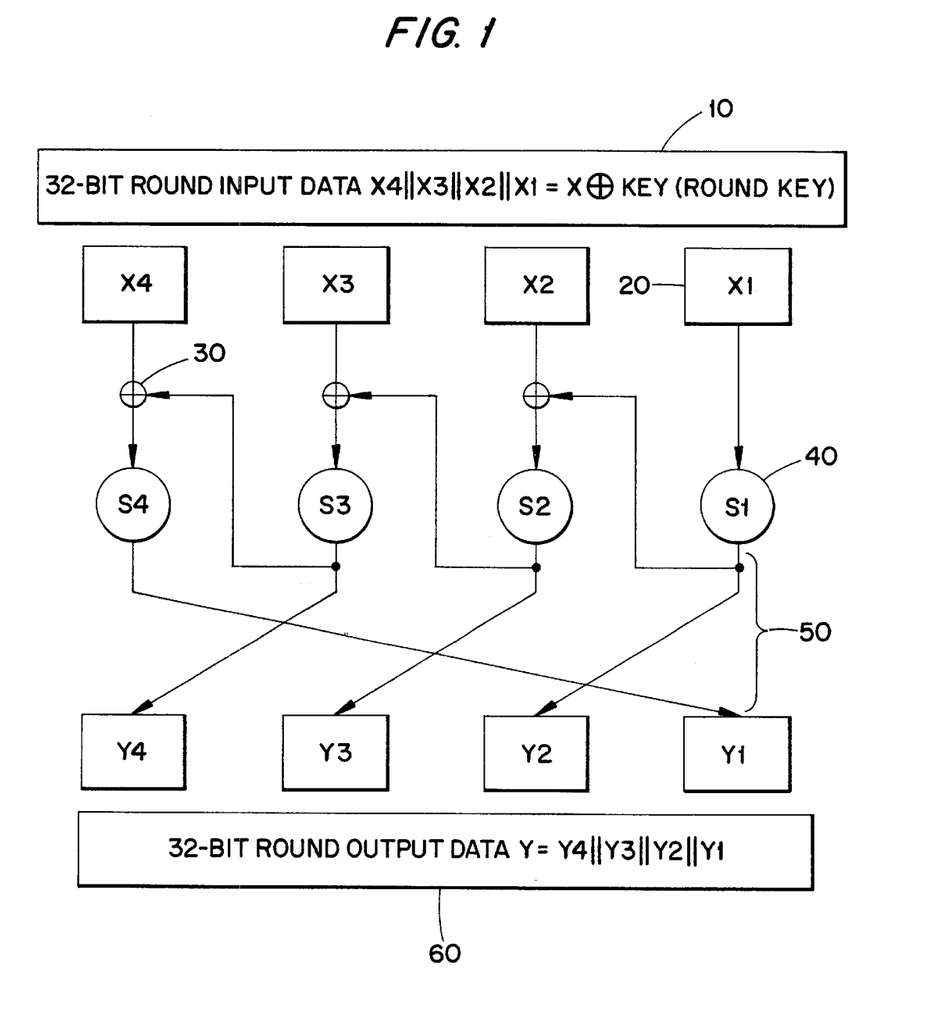
FIG. 1 illustrates the round function structure of the present invention, which is the main core part of SNAKE algorithm.

The round function will now be described. With reference to FIG. 1, block 10 illustrates a 32-bit input data block combined (via an exclusive-OR operator) with the 32-bit round key which was scheduled by said key generation method. Block 20 illustrates an 8-bit subdivided data block of the total 32-bit input data X from the 32-bits input data block. Block 30 illustrates a logical exclusive-OR operator. Block 40 illustrates a 256×8 S-box which is a nonlinear function of 8-bit input data to 8-bit output data. Block 50 illustrates a one byte (8-bit) rotation of the concatenated 32-bit data from the 8-bit output blocks from the S-boxes. Block 60 illustrates the 32-bit output data from the round function.

If the 32-bit data X⊕Ki=X4∥X3∥X2∥X1 (Xi: 8-bit sub-blocks, which are concatenated in order of the least significant block from the most right part, Ki is the i-th round key) input to the round function F, then its output, Y=Y4∥Y3∥Y2∥Y1, of F is given by the following formulas:

Y2=S1 (X1);

Y3=S2 (X2⊕Y2);

Y4=S3 (X3⊕Y3);

Y1=S4 (X4⊕Y4);

Y=Y4∥Y3∥Y2∥Y1.

Figure 3:
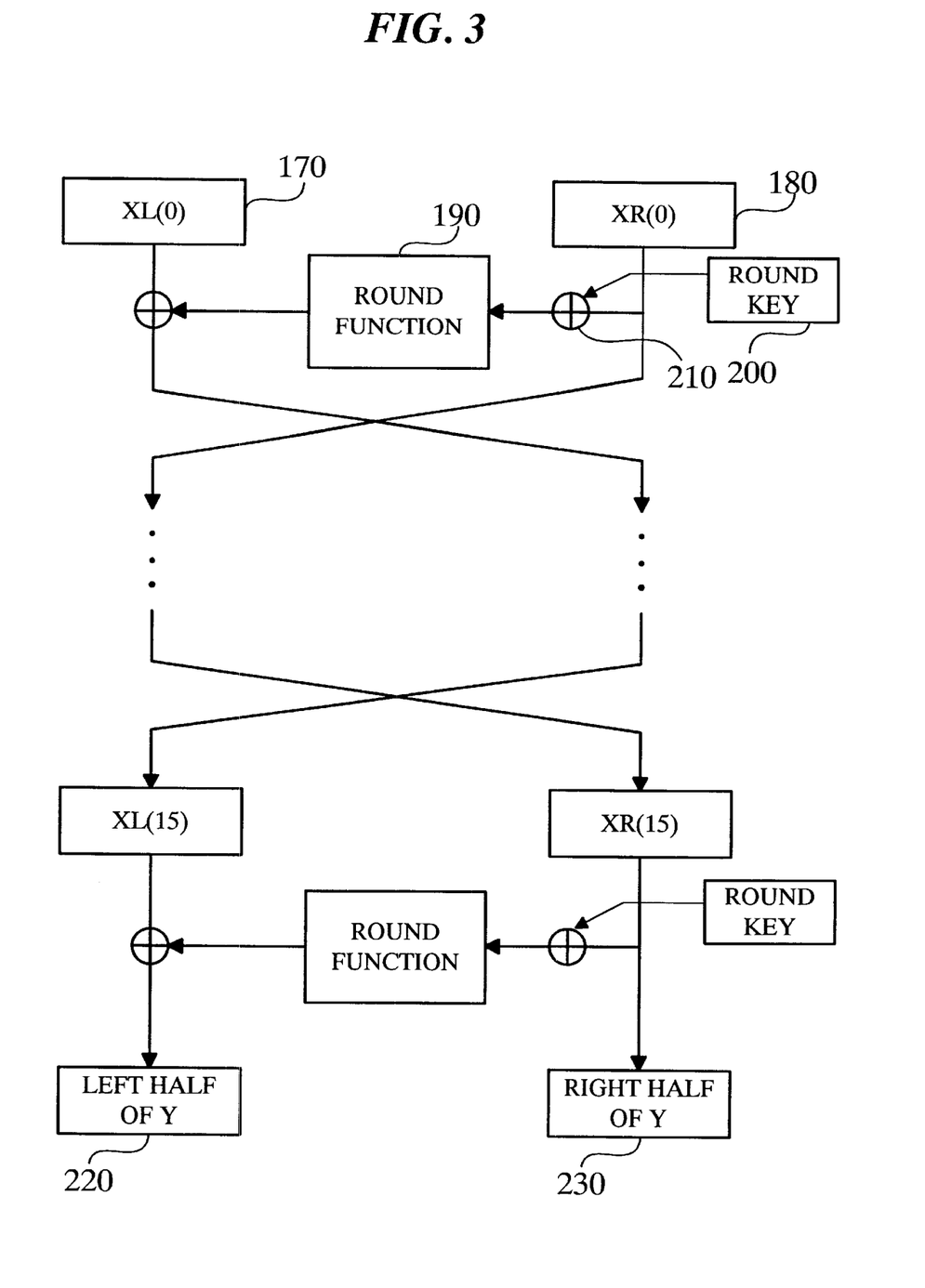
FIG. 3 illustrates the whole Feistel type structure of the present invention.

Referring to FIG. 3, block 170 illustrates the 32-bit left half of the 64-bit input plain text to the cipher SNAKE.

Block 180 illustrates the 32-bit right half of the 64-bit input plain text to the cipher SNAKE. Block 190 illustrates the round function of SNAKE of which structure was described in FIG. 1. Block 200 illustrates a round key generated from SNAKE's key scheduling process shown in FIGS. 2A–2B. Block 210 illustrates a logic exclusive-OR operator. Block 220 illustrates the 32-bit left half of the 64-bit final output data such as encrypted data or cipher text, through the 16 round process of SNAKE which executes a one-round process, repeated 16 times. Block 230 illustrates the 32-bit right half of the 64-bit final output data such as encrypted data or cipher text through the 16 round process of SNAKE which executes a one-round process, repeated 16 times.

In summary, SNAKE operates on a 64-bit block of plain text. The block is broken into a right half and a left half, each 32-bits long. Then there are 16 rounds of identical operations, with reference to FIG. 3, called round function F, in which the data are combined with the key via XOR-operation. After the sixteenth round, the right and left halves are joined, and the algorithm is completed. In each round the right half (32-bits) of the previous round's output data is combined with its round key (via XOR) and the resulting data is broken into four 8-bit data blocks, X1, X2, X3, X4.

The data blocks form the input data to the previously described round function F. Again, this output data of F are combined with the 32-bit left half data block via XOR to be the next or new round's right half data block (the old right half becomes the new left half). These operations are repeated 16 times, thereby making 16 rounds of SNAKE.

If $B_j$ is the result of the j-th iteration, $L_j$ and $R_j$ are the left and right halves of $B_j$, $K_j$ is the key for the round j, and F is the round function described previously, then a round looks like:

$L_j = R_{j-1}$;
$R_j = L_{j-1} \oplus F(R_{j-1} \oplus K_j)$;

In the present invention, the security (resistance) of SNAKE could be deduced from consideration of the output difference data from each S-box is seen if given a pair of data values with a difference (input difference) as variable parameters, and constructing a linear system of equations of the difference variable parameters to get its coefficient matrix, which is called 'Transient Differential Matrix'. By making or finding some conditions to confine the cipher to its 'rank', the round function structure of SNAKE can be deduced. The proof of the security was disclosed in Changhyi Lee and Young-tae Cha, "The Block Cipher: SNAKE with Provable Resistance against-DC and LC Attacks", JW-ISC, (1997), herein incorporated by reference.

The processing speed of the present invention is faster than that of DES. In the simulation of SNAKE, implemented in the C++ language on a 120 MHz PENTIUM PC, the encryption process of the present invention performs at 16 Mbps, while DES performs at 10.4 Mbps on the same machine.

The invention may be embodied in a general purpose digital computer that is running a program or program segments originating from a computer readable or usable medium, such medium including, but not limited to, magnetic storage media (e.g., ROMs, floppy disks, hard disks, etc.), optically readable media (e.g., CD-ROMs, DVDs, etc.), and carrier waves (e.g., transmissions over the Internet). A functional program, code and code segments, used to implement the present invention can be derived by a skilled computer programmer from the description of the invention contained herein.

The previous description of the exemplary embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A block cipher method having a round process and having a key scheduling algorithm, comprising:

(a) dividing a data stream into 2N-byte data blocks, each block being divided into a first half block and a second half block;

(b) executing a logical exclusive-OR operation with the second half block and an N-byte round key;

(c) dividing a result of step (b) into N divided blocks, sending a first divided block to a first S-box S1 and sending to each remaining S-box S2, . . . , Sn a result of executing a logical exclusive-OR operation of each corresponding divided block with output data from the previous S-box;

(d) rotating an N-byte result of step (c) to the left by M bits;

(e) executing a logical exclusive-OR operation with the first half block and a result of step (d);

(f) relabeling the second half block as a new first half block for use in a next round, said next round utilizing a next round key;

(g) relabeling a result of step (e) as a new second half block for use in said next round;

(h) executing subsequent rounds by repeating steps (b) through (g) until just before a final round;

(i) sending a final second half block to a right half of a final output and executing a logical exclusive-OR operation with the final second half block and a final N-byte round key;

(j) dividing a result of the logical exclusive-OR operation of step (i) into N final-round blocks, sending a first final-round block to the first S-box and sending to each remaining S-box a result of executing a logical exclusive-OR operation of each corresponding final-round block with output data from the previous S-box;

(k) rotating an N-byte result of step (j) to the left by M bits; and (l) sending a result of executing a logical exclusive-OR operation with a final first half block and a result of step (k) to a left half of the final output.

2. The block cipher method of claim 1, wherein said round keys are generated by a method comprising the steps of:

(m) breaking N-byte seed key data into N seed sub-blocks;

(n) executing modular addition with a first seed sub-block and an N-th seed sub-block and sending a result of this modular addition to a first intermediate-result sub-block of an N-byte intermediate result;

(o) executing a logical exclusive-OR operation with a second seed sub-block and the first intermediate-result sub-block resulting from step (n) and sending a result of this logical exclusive-OR operation to a second intermediate-result sub-block of the N-byte intermediate result;

(p) executing modular addition with a j-th seed sub-block and a (j−1)-th intermediate-result sub-block and sending a result of this modular addition to a j-th intermediate-result sub-block of the N-byte intermediate result;

(q) executing a logical exclusive-OR operation with a (j+1)-th seed sub-block and the j-th intermediate-result sub-block and sending a result of this logical exclusive-OR operation to a (j+1)-th intermediate-result sub-block of the N-byte intermediate result;

(r) carrying out steps (p) and (q) repeatedly for j=3, 5, 7, ..., (N−1) until an N-th intermediate-result sub-block of the N-byte intermediate result is generated;

(s) executing a logical exclusive-OR operation with the N-byte intermediate result and an N-byte number having a random sequence of bits;

(t) executing on a result of step (s) a rotation operation to the left by L bits;

(u) assigning a result of step (t) to be a first round key having N-bytes;

(v) substituting the first round key for the previous N-byte seed key data for use as new N-byte seed key data and repeating steps (m) through (t) in order to generate a second round key; and (w) repeating steps (m) through (t) to generate subsequent round keys, wherein each subsequent round key is generated by using the preceding round key as N-byte seed key data in step (m).

3. A computer useable medium having embodied thereon a computer program for executing a block cipher, the block cipher having a round process, the computer program being executable by a machine to perform the steps of:

(a) dividing a data stream into 2N-byte data blocks, each block being divided into a first half block and a second half block;

(b) executing a logical exclusive-OR operation with the second half block and an N-byte round key;

(c) dividing a result of step (b) into N divided blocks, sending a first divided block to a first S-box SI and sending to each remaining S-box S2, ..., Sn a result of executing a logical exclusive-OR operation of each corresponding divided block with output data from the previous S-box;

(d) rotating an N-byte result of step (c) to the left by M bits;

(e) executing a logical exclusive-OR operation with the first half block and a result of step (d);

(f) relabeling the second half block as a new first half block for use in a next round, said next round utilizing a next round key;

(g) relabeling a result of step (e) as a new second half block for use in said next round;

(h) executing subsequent rounds by repeating steps (b) through (g) until just before a final round;

(i) sending a final second half block to a right half of a final output and executing a logical exclusive-OR operation with the final second half block and a final Nbyte round key;

(j) dividing a result of the logical exclusive-OR operation of step (i) into N final-round blocks, sending a first final-round block to the first S-box and sending to each remaining S-box a result of executing a logical exclusive-OR operation of each corresponding final-round block with output data from the previous S-box;

(k) rotating an N-byte result of step (j) to the left by M bits; and (l) sending a result of executing a logical exclusive-OR operation with a final first half block and a result of step (k) to a left half of the final output.

4. The computer useable medium of claim 3, wherein said round keys are generated by a method comprising the steps of:

(m) breaking N-byte seed key data into N seed sub-blocks;

(n) executing modular addition with a first seed sub-block and an N-th seed sub-block and sending a result of this modular addition to a first intermediate-result sub-block of an N-byte intermediate result;

(o) executing a logical exclusive-OR operation with a second seed sub-block and the first intermediate-result sub-block resulting from step (n) and sending a result of this logical exclusive-OR operation to a second intermediate-result sub-block of the N-byte intermediate result;

(p) executing modular addition with a j-th seed sub-block and a (j−1)-th intermediate-result sub-block and sending a result of this modular addition to a j-th intermediate-result sub-block of the N-byte intermediate result;

(q) executing a logical exclusive-OR operation with a (j+1)-th seed sub-block and the j-th intermediate-result sub-block and sending a result of this logical exclusive-OR operation to a (j+1)-th intermediate-result sub-block of the N-byte intermediate result;

(r) carrying out steps (p) and (q) repeatedly for j=3, 5, 7, ..., (N−1) until an N-th intermediate-result sub-block of the N-byte intermediate result is generated;

(s) executing a logical exclusive-OR operation with the N-byte intermediate result and an N-byte number having a random sequence of bits;

(t) executing on a result of step (s) a rotation operation to the left by L bits;

(u) assigning a result of step (t) to be a first round key having N-bytes;

(v) substituting the first round key for the previous N-byte seed key data for use as new N-byte seed key data and repeating steps (m) through (t) in order to generate a second round key; and (w) repeating steps (m) through (t) to generate subsequent round keys, wherein each subsequent round key is generated by using the preceding round key as N-byte seed key data in step (m).

5. The block cipher method of claim 2, wherein said divided blocks, said finalround blocks, and said seed sub-blocks are 8 bits in length, wherein said modular addition is 256-modular addition, and wherein M=8 and L=5.

6. The block cipher method of claim 5, wherein said S-boxes S1, S2, ..., Sn are selected from one of Type 1 or Type 2, wherein:

Type 1: S1=S2= ... =Sn=f(x)
Type 2: S1=S3=S5= ... =f(x)
S2=S4=S6= ... =g(x), wherein $f(x)=x^{-1}$ is an algebraic inversion of the Galois Field GF(256) and g(x)=h(h(x)) is the self-composition of the modular exponent function based 45, wherein $h(x)=45^x \mod 257$.

7. The block cipher method of claim 1, wherein said divided blocks and said final-round blocks are 8 bits in length, and wherein M=8.

8. The block cipher method of claim 7, wherein said S-boxes S1, S2, ..., Sn are selected from one of Type 1 or Type 2, wherein:

Type 1: S1=S2= . . . =Sn=f(x)
Type 2: S1=S3=S5= . . . =f(x)
   S2=S4=S6= . . . =g(x),
wherein $f(x)=x^{-1}$ is an algebraic inversion of the Galois Field GF(256) and g(x)=h(h(x)) is the self-composition of the modular exponent function based 45, wherein $h(x)=45^x$ mod 257.

9. The block cipher method of claim 1, wherein said round keys are generated by a method comprising the steps of:
   (m) breaking a seed key into a plurality of N-byte seed key blocks;
   (n) assigning a first N-byte seed key block to be a first N-byte round key;
   (o) assigning a second N-byte seed key block to be a second N-byte round key;
   (p) executing a function using the second N-byte seed key block as input into the function, the function producing N-byte output;
   (q) executing a logical exclusive-OR operation with a result of step (p) and a fourth N-byte seed key block;
   (r) assigning a result of step (q) to be a third N-byte round key;
   (s) executing the function using the first N-byte seed key block as input into the function;
   (t) executing a logical exclusive-OR operation with a result of step (s) and a third N-byte seed key block;
   (u) assigning a result of step (t) to be a fourth round key; and
   (v) generating remaining round keys, wherein an (i+1)-th round key is generated by executing a logical exclusive-OR operation with an (i−1)-th round key and a result of executing the function on an i-th round key, wherein the remaining round keys are generated for i=4, 5, 6, etc. until a final round key is generated.

10. The block cipher method of claim 9, wherein executing the function comprises the steps of:
   (1) breaking N-byte seed-key data into N seed sub-blocks;
   (2) executing modular-addition with a first seed sub-block and an N-th seed sub-block and sending a result of this modular addition to a first intermediate-result sub-block of an N-byte intermediate result;
   (3) executing a logical exclusive-OR operation with a second seed sub-block and the first intermediate-result sub-block resulting from step (2) and sending a result of this logical exclusive-OR operation to a second intermediate-result sub-block of the N-byte intermediate result;
   (4) executing modular addition with a j-th seed sub-block and a (j−1)-th intermediate-result sub-block and sending a result of this modular addition to a j-th intermediate-result sub-block of the N-byte intermediate result;
   (5) executing a logical exclusive-OR operation with a (j+1)-th seed sub-block and the j-th intermediate-result sub-block and sending a result of this logical exclusive-OR operation to a (j+1)-th intermediate-result sub-block of the N-byte intermediate result;
   (6) carrying out steps (4) and (5) repeatedly for j=3, 5, 7, . . . , (N−1) until an N-th intermediate-result sub-block is generated;
   (7) executing a logical exclusive-OR operation with the N-byte intermediate result and an N-byte number having a random sequence of bits; and
   (8) executing on a result of step (7) a rotation operation to the left by L bits.

11. The block cipher method of claim 10, wherein said divided blocks, said final-round blocks, and said seed sub-blocks are 8 bits in length, wherein said modular addition is 256-modular addition, and wherein M=8 and L=5.

12. The computer useable medium of claim 4, wherein said divided blocks, said final-round blocks, and said seed sub-blocks are 8 bits in length, wherein said modular addition is 256-modular addition, and wherein M=8 and L=5.

13. The computer useable medium of claim 3, wherein said divided blocks and said final-round blocks are 8 bits in length, and wherein M=8.

14. The computer useable medium of claim 13, wherein the round process repeats sixteen times and wherein sixteen round keys are utilized.

15. The computer useable medium of claim 4, wherein said N-byte number having a random sequence of bits is "0xb7e15163" and wherein N=4.

16. A block cipher method, comprising the steps of:
   (a) dividing a data stream into blocks, each block being divided into a first half block and a second half block;
   (b) combining the second half block with a round key using a first logical operation;
   (c) dividing a result of step (b) into sub-blocks, using a first sub-block to provide input into a first S-box, and using remaining sub-blocks to provide input into remaining S-boxes, wherein a remaining sub-block is combined with output from a remaining S-box using a second logical operation, and wherein the result of the second logical operation is provided as input into another S-box;
   (d) permuting the outputs from the S-boxes resulting from step (c);
   (e) combining a result of step (d) with the first half block using a third logical operation;
   (f) relabeling the second half block as a new first half block for use in a next round, the next round utilizing a next round key;
   (g) relabeling a result of step (e) as a new second half block for use in the next round;
   (h) repeating steps (b) through (g) for subsequent rounds;
   (i) generating a right half of a final output using a final second half block; and
   (j) generating a left half of the final output using a final first half block.

17. The block cipher method of claim 16, wherein the first, second and third logical operations are selected from the group consisting of exclusive-OR and modular addition.

18. The block cipher method of claim 17, wherein permuting the outputs of the S-boxes referred to in step (d) comprises rotating the outputs of the S-boxes by a predetermined number of bits.

19. The block cipher method of claim 18, wherein the second logical operation is the exclusive-OR operation, and wherein the input to the k-th S-box in step (c) is given by X(k)⊕S(k−1), wherein
   X(k) represents the k-th sub-block,
   S(k−1) represents the output from (k−1)-th S-box,
   ⊕ represents the exclusive-OR operation, and
   k>1.

20. The block cipher method of claim 19, wherein the first and third logical operations are exclusive-OR operations.

21. A method of generating round keys, comprising the steps of:
   (a) breaking a seed key into a plurality of seed key blocks;

(b) assigning a first seed key block to be a first round key, K(1);

(c) assigning a second seed key block to be a second round key, K(2);

(d) generating subsequent round keys using output from a key-generating function (FUNCTION) wherein at least some of said subsequent round keys are generated according to the relation K(i+1)=FUNCTION(K(i))□K(i−1), wherein K(i+1) is the (i+1)-th round key,
K(i−1) is the (i−1)-th round key,
K(i) is the i-th round key,
i≠1, and
□ represents a first logical operation that combines FUNCTION(K(i)) and K(i−1).

22. The method of claim 21, wherein the first logical operation □ is one of an exclusive-OR operation and modular addition.

23. The method of claim 22, wherein the key-generating function (FUNCTION) performs steps including:

(e) breaking input data into sub-blocks, Q(j);

(f) combining sub-blocks using second and third logical operations to generate intermediate sub-blocks, T(j);

(g) combining the result of step (f) with a number having a random sequence of bits using a fourth logical operation; and (h) permuting the result of step (g).

24. The method of claim 23, wherein the combining in step (f) generates intermediate sub-blocks, T(j), according to the relation T(j)=Q(j)◇T(j−1), wherein ◇ represents either of the second and third logical operations, and wherein j>1.

25. The method of claim 24, wherein the second, third, and fourth logical operations are selected from the group consisting of exclusive-OR and modular addition.

26. The method of claim 25, wherein said permuting in step (h) comprises rotating by a predetermined number of bits.

\* \* \* \* \*